(12) United States Patent
Li et al.

(10) Patent No.: US 12,034,257 B2
(45) Date of Patent: Jul. 9, 2024

(54) POWER PLUG WITH LEAKAGE CURRENT PROTECTION AND ADAPTED TO BE ASSEMBLED WITH A POWER CORD

(71) Applicant: Chengli Li, Suzhou (CN)

(72) Inventors: Chengli Li, Suzhou (CN); Xiaoming Zhang, Suzhou (CN); Fei Lin, Suzhou (CN)

(73) Assignee: Chengli Li, Suzhou (CN)

( * ) Notice: Subject to any disclaimer, the term of this patent is extended or adjusted under 35 U.S.C. 154(b) by 206 days.

(21) Appl. No.: 17/740,092

(22) Filed: May 9, 2022

(65) Prior Publication Data

US 2023/0352885 A1    Nov. 2, 2023

(30) Foreign Application Priority Data

Apr. 29, 2022  (CN) .......................... 202210478271.2
Apr. 29, 2022  (CN) .......................... 202221041849.X

(51) Int. Cl.
*H01R 13/66*  (2006.01)
*H01R 24/28*  (2011.01)
*H02H 3/16*   (2006.01)

(52) U.S. Cl.
CPC .......... *H01R 13/665* (2013.01); *H01R 24/28* (2013.01); *H02H 3/162* (2013.01)

(58) Field of Classification Search
CPC .. H01R 13/665; H01R 24/28; H01R 13/7135; H01R 13/6683; H02H 3/162
USPC .......................................................... 361/42
See application file for complete search history.

(56) References Cited

U.S. PATENT DOCUMENTS

| | | | | |
|---|---|---|---|---|
| 9,713,273 | B2* | 7/2017 | Li ......................... | H02H 9/005 |
| 10,770,844 | B2* | 9/2020 | Nie ..................... | H01R 13/5816 |
| 2006/0246770 | A1* | 11/2006 | Wu ....................... | H01R 13/59 |
| | | | | 439/460 |
| 2011/0250783 | A1* | 10/2011 | Su ...................... | H01R 13/6592 |
| | | | | 29/857 |
| 2012/0302077 | A1* | 11/2012 | Wu ................... | H01R 13/5213 |
| | | | | 439/135 |

FOREIGN PATENT DOCUMENTS

CN           213660759 U  *  7/2021

* cited by examiner

*Primary Examiner* — Thienvu V Tran
*Assistant Examiner* — Sreeya Sreevatsa
(74) *Attorney, Agent, or Firm* — Chen Yoshimura LLP

(57) ABSTRACT

A leakage current protection device (such as a power plug) for an electrical appliance includes a shell and a trip assembly inside the shell. The shell includes an upper cover and a base cover joined together, and either the upper cover or the base cover includes a first cover and a removable second cover. The removable second cover spatially corresponds to a tail portion of the trip assembly; when it is removed, the tail portion is exposed to allow a power cord to be connected to the leakage current protection device. By using a removable second cover, the cord can be conveniently assembled with the device when the device is installed on the electrical appliance, allowing the to be shipped without the cord. This can reduce the packed size of the device for easier shipping and storage, as well as lowering cost. It also makes the device more versatile.

10 Claims, 4 Drawing Sheets

POWER PLUG WITH LEAKAGE CURRENT PROTECTION AND ADAPTED TO BE ASSEMBLED WITH A POWER CORD

BACKGROUND OF THE INVENTION

Field of the Invention

This invention relates to leakage current protection devices, and in particular, it relates to a power plug with leakage current protection function and adapted to be assemble with a power cord, or such a power plug assembled with a power cord.

Description of Related Art

Conventional leakage current protection devices, such as power receptacles and power plugs, typically have their own power cords permanently attached to the leakage current protection devices. The power plugs with cords are typically supplied by manufacturers of power plugs to manufacturers of appliances, and then assembled with the appliances by the latter. The cords increase the overall packaged sizes of the power plugs, thereby increasing shipping cost. Moreover, for different appliances, different power cords may be required, which increases the manufacturing complexity for the manufacturers of power plugs.

SUMMARY

To solve the above problems of the conventional technology, embodiments of the present invention provide a leakage current protection device adapted to be assembled with a power cord, so that the power plug incorporating the leakage current protection function may be supplied to appliance manufacturers either with power cords pre-attached, or without the cords, in which case the appliance manufacturers may assemble plugs with desired cords for the particular appliances.

To achieve the above objects, the present invention provides a leakage current protection device which includes: a shell, and a trip assembly disposed inside the shell, configured to control electrical connection and disconnection between input and output ends of the leakage current protection device, the trip assembly having a tail portion adapted to be connected to electrical terminals of a power cord; wherein the shell includes an upper cover and a base cover joined to each other, wherein either the upper cover or the base cover includes a first cover and a removable second cover, and wherein the second cover spatially corresponds to the tail portion of the trip assembly and is configured to expose the tail portion when the second cover is removed.

In some embodiments, the upper cover includes the first cover and the removable second cover, wherein the first cover and the base cover include snaps configured to affix them to each other, and the second cover is fitted over the base cover and affixed to the base cover by fasteners.

In some embodiments, the tail portion of the trip assembly includes an electrical wire connection structure, the electrical wire connection structure including a plurality of through holes or open slots.

In some embodiments, the second cover includes one or more guiderails and the base cover includes one or more corresponding guiding troughs, wherein the guiderails are configured to fit into the corresponding guiding troughs when the second cover is affixed to the base cover.

In some embodiments, the first cover further includes a support shoulder which is recessed from an exterior surface of the first cover and configured to abut an inner side of the second cover.

In some embodiments, the second cover includes a pair of spaced-apart guiderails located near the tail portion of the trip assembly, and a first wire crimping edge formed between the pair of guiderails and recessed upwards from tips of the guiderails, wherein the base cover includes a second wire crimping edge at a location corresponding to the first crimping edge, and wherein the first and second crimping edges are adapted to crimp a portion of the power cord between them when the power cord is attached and the second cover is fitted over the base cover.

In some embodiments, the second cover further includes a first strain relief slot separated from the first crimping edge, and the base cover further includes a second strain relief slot separated from the second crimping edge, wherein the first strain relief slot and the second strain relief slot correspond to each other in space, and wherein a distance between the first crimping edge and the second crimping edge is smaller than a distance between the first strain relief slot and the second strain relief slot.

In some embodiments, a recess depth of the first crimping edge of the second cover is a predetermined depth that accommodates a size and shape of the power cord to be connected to the trip assembly.

In some embodiments, the first cover includes a plurality of hooks and/or buckles, and the base cover includes a corresponding plurality of buckles and/or hooks, the hooks and/or buckles of the first cover being configured to engage with the corresponding buckles and/or hooks of the base cover to form a plurality of snaps, which are configured to affix the first cover to the base cover.

In some embodiments, the device further includes the power cord, the power cord including the electrical terminals connected to the tail portion of the trip assembly.

By using a removable second cover as a part of the shell, the second cover can expose the trip assembly tail portion, so that the cord can be conveniently assembled with the leakage current protection device when the device is installed on the electrical appliance, allowing the leakage current protection device to be shipped without the cord. This can reduce the packed size of the leakage current protection device for easier shipping and storage, as well as lowering cost. It also makes the leakage current protection device more versatile. The leakage current protection device also have a relatively simple structure and is easy to manufacture.

BRIEF DESCRIPTION OF THE DRAWINGS

Preferred embodiments of the present invention are described with reference to the drawings.

DETAILED DESCRIPTION OF PREFERRED EMBODIMENTS

Preferred embodiments of the present and their applications are described below. It should be understood that these descriptions describe embodiments of the present invention but do not limit the scope of the invention. When describing the various components, directional terms such as "up," "down," "top," "bottom" etc. are not absolute but are relative. These terms may correspond to the views in the various illustrations, and can change when the views or the relative positions of the components change.

In this disclosure, terms such as "connect", "couple", "link" etc. should be understood broadly; for example, they may be fixed connections, or removable or detachable connections, or integrally connected for integrally formed; they may be directly connected, or indirectly connected via intermediate parts. Those skilled in the relevant art can readily understand the meaning of these terms as used in this disclosure based on the specific description and context.

Embodiments of the present invention solve various problems of conventional power plugs with leakage current protection function, such as relatively large package sizes which make them more difficult to ship and store, and the inability to adapt to different electrical appliance. The power plugs according to embodiments of the present invention have a relatively small packaged volume, and is adapted to be assembled with power cords at the installation site where they are installed on electrical appliances. The following descriptions uses a power plug as an example of a leakage current protection device that embodies the present invention; other examples include power receptacles.

Figure 1:
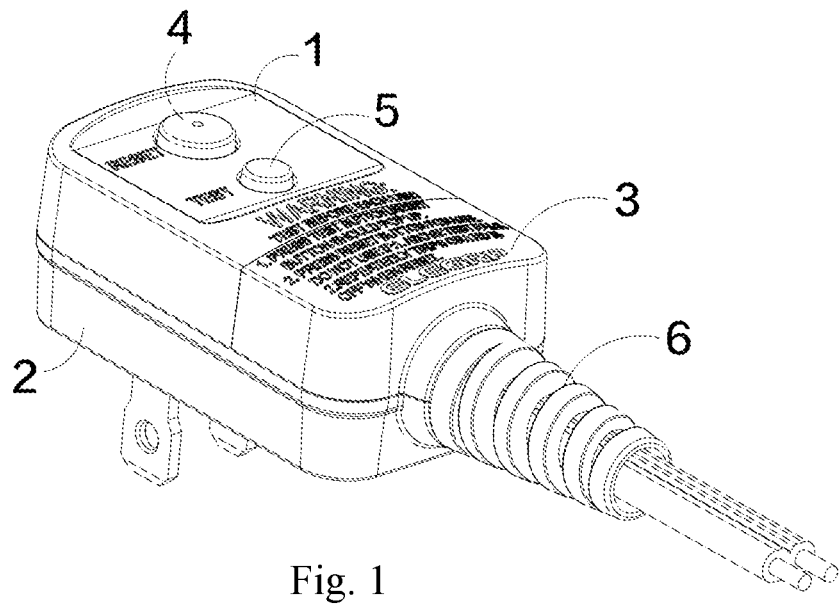
FIG. 1 is an exterior view of a power plug with leakage current protection and assembled with a power cord according an embodiment of the present invention.
Figure 2:
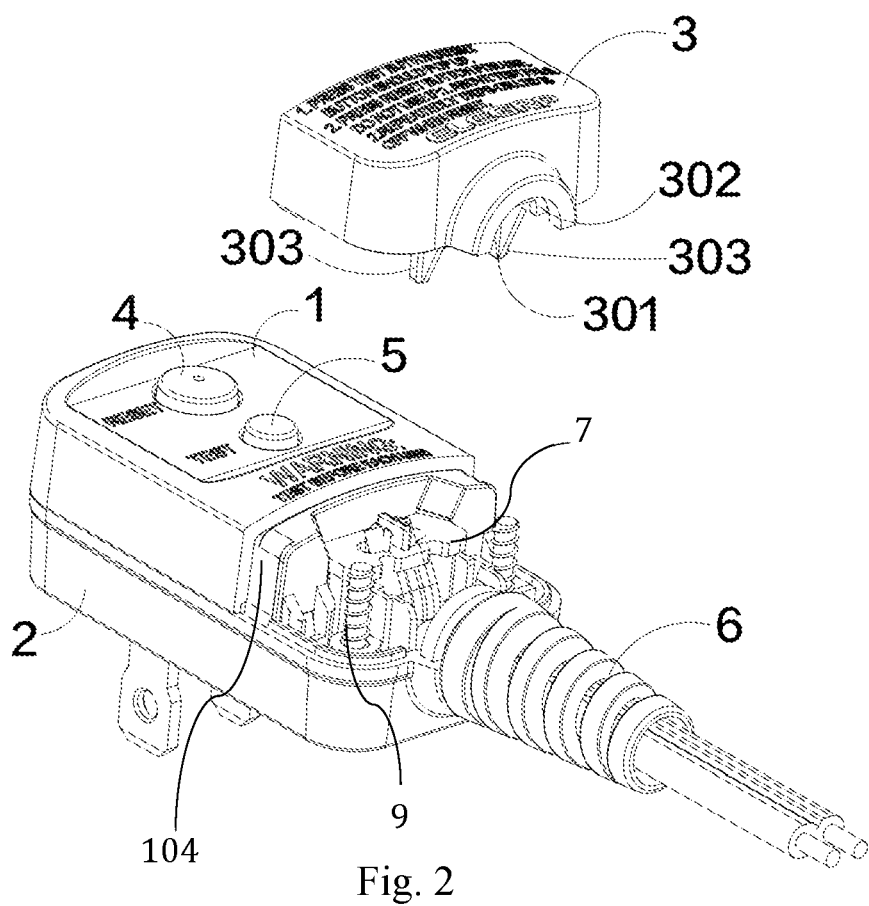
FIG. 2 is a partially disassembled view of the power plug of FIG. 1, with the second cover removed.
Figure 3:
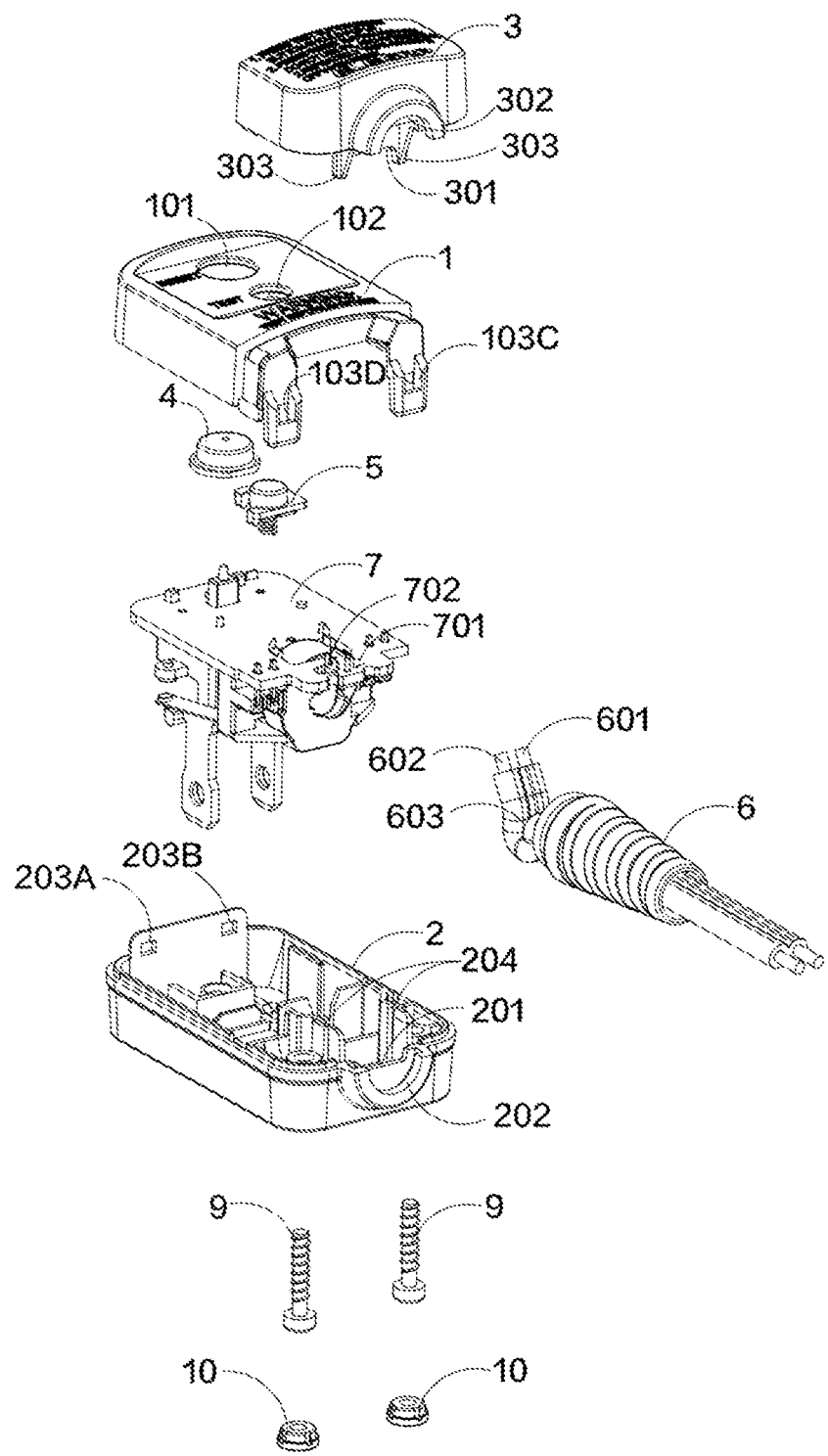
FIG. 3 is an exploded view of the power plug of FIG. 1.

FIGS. 1-3 illustrate a power plug assembled with a power cord according to an embodiment of the present invention. In the descriptions below, the term "power plug" may refer to the plug head without the cord or the plug head with the cord, depending on context. The power plug includes a shell, a trip assembly 7 disposed within the shell, and a power cord 6 which is connected to the shell and extends to the exterior of the shell. The power cord 6 preferably includes a cable strain relief. In the illustrated embodiment, the shell includes an upper cover and a base cover 2; the upper cover includes a first cover 1 and a removeable second cover 3. The second cover 3 spatially corresponds to a tail portion of the trip assembly 7 that is configured for connection to the power cord, such that in an installation state when the second cover 3 is removed, as shown in FIG. 2, the tail portion is exposed and can be connected to the power cord 6.

In should be noted that in some alternative embodiments, the base cover 2 may also includes two covers, so as to expose the tail portion of the trip assembly 7 for purposes of connecting the cord.

Figures 5A, 5B:
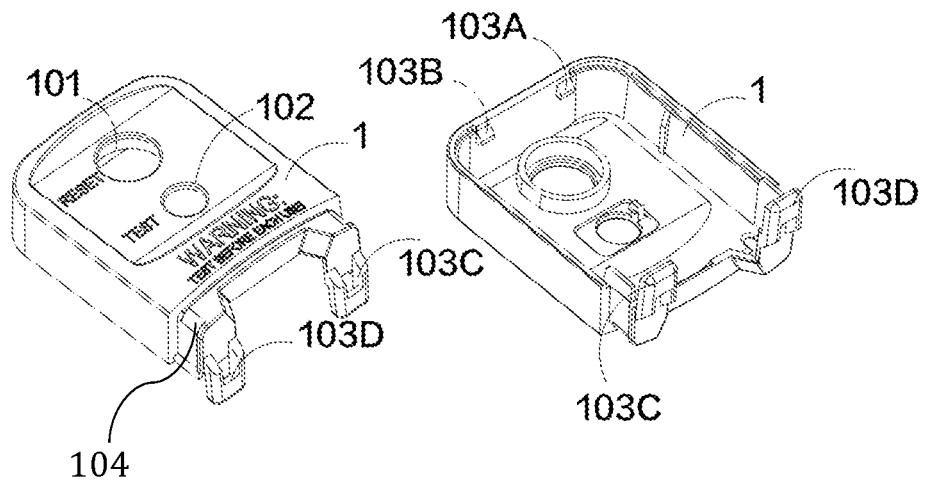
FIG. 5A illustrates the exterior the first cover of the device of FIG. 1.
FIG. 5B illustrates the interior the first cover of the device of FIG. 1.
Figure 5C:
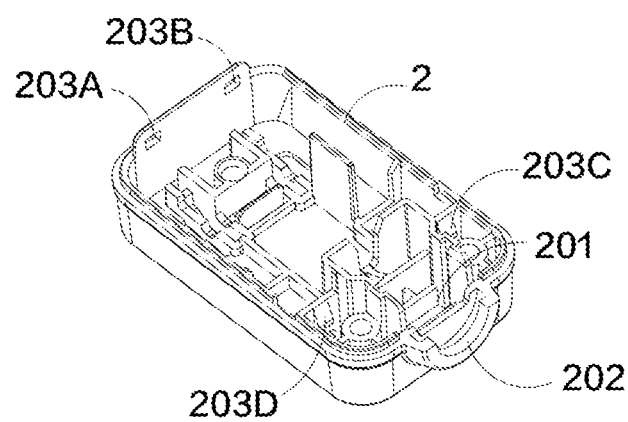
FIG. 5C illustrates the interior the base cover of the device of FIG. 1.

Preferably, the first cover 1 and the base cover 2 are affixed to each other by snaps. The second cover 3 and the base cover 2 may be fitted together and then fastened by fasteners such as screws. Referring to FIGS. 5A-5C, the first cover 1 may include multiple hooks and/or buckles, such as two hooks 103A and 103B and two buckles 103C and 103D in the illustrated example. Correspondingly, the base cover 2 may include multiple buckles and/or hooks, such as two buckles 202A and 203B and two hooks 203C and 203D in the illustrated example. The hooks and corresponding buckles are configured to engage with each other to form snaps. Such snap structures allow the first cover 1 and base cover 2 to be securely and conveniently affixed to each other, saving assembly time and ensuring that the two parts remain connected without using fastening screws. Further, in the illustrated embodiment, the power plug includes a reset assembly and a test assembly, and the first cover 1 is provided with a reset button guide hole 101 and a test button guide hole 102 to respectively allow the reset button 4 and the test button 5 to extend out of the shell.

Referring to FIGS. 2 and 3, the second cover 3 includes guiderails, configured to fit into corresponding guiding troughs in the base cover 2, such that the second cover 3 and the base cover 2 fittingly engage with each other. In the illustrated embodiment, the second cover 3 includes a pair of spaced-apart guiderails 303, located near the tail portion of the trip assembly 7; correspondingly, the base cover 2 includes a pair of guiding troughs 204. This way, the guiderails 303 of the second cover 3 may be inserted into the guiding troughs 204 of the base cover 2 located below them, as shown in FIG. 3, so as to correctly position the second cover 3 with respect to the base cover 2. Then, using multiple fasteners, such as the two screws 9 shown in FIG. 3, the second cover 3 is removably affixed to the base cover 2 and the entire plug is securely assembled together. FIG. 3 also shows two corresponding screw hole plug 10 to seal the screw holes.

In some embodiments, as shown in FIG. 2, the first cover 1 further includes a support shoulder 104 that is recessed from the exterior surface of the first cover 1 and located near the abutting surfaces of the first cover 1 and second cover 3 when the second cover 3 is in the assembled state. The support shoulder 104 functions to position and stably support the second cover 3. It abuts the inner side of the second cover 3 and also covers (from the inside) any gap between the first cover and the second cover, thereby improving the exterior appearance of the power plug.

Figure 4A:
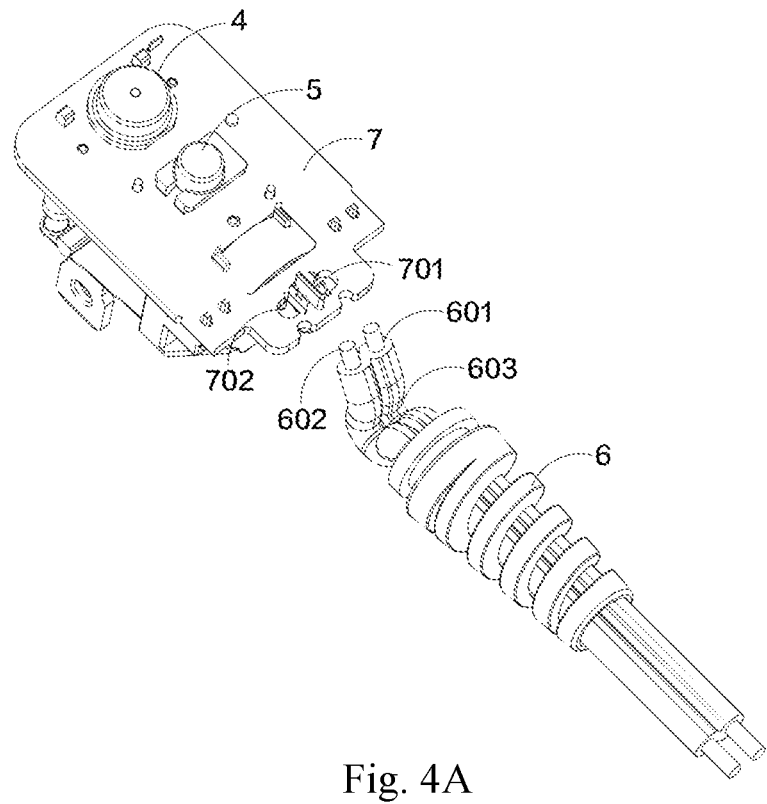
FIG. 4A illustrates the trip assembly of the device with a power cord to be assembled, in the embodiment of FIG. 1.
Figure 4B:
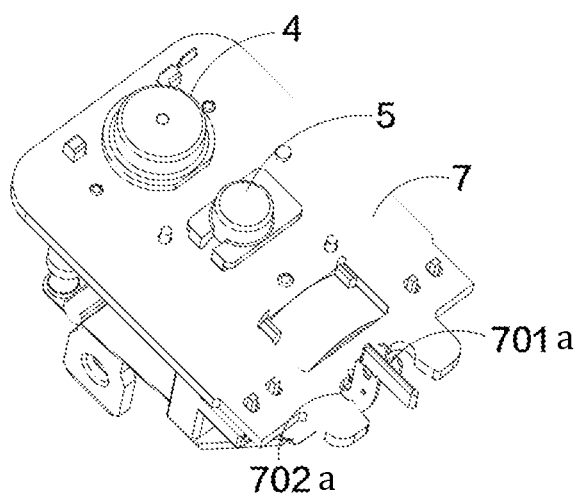
FIG. 4B illustrates an alternative trip assembly of the device of FIG. 1.

In the illustrated embodiment, the trip assembly 7 includes a printed circuit board (PCB), and an input assembly and an output assembly electrically coupled to the PCB, so as to achieve the electrical connection between the input end (the insertion prongs) and output ends (the cord) of the power plug. Referring to FIGS. 4A and 4B, an electrical wire connection structure, in the form of holes or slots on the PCB, is provided in the tail portion of the trip assembly 7. In the embodiment of FIG. 4A, the electrical wire connection structure include through holes with closed peripheries. When the user needs to connect the power cord to the plug, the second cover 3 may be removed. Then, the hot line terminal (one of the electrical terminals) 601 and the neutral line terminal (another one of the electrical terminals) 602 of the power cord 6 are respectively aligned with and inserted through the hot line solder hole 701 and neutral line solder hole 702 on the PCB of the trip assembly 7, and the two terminals are respectively soldered to the solder holes. The second cover 3 is re-attached using the fastening screws 9. This completes the installation of the power cord 6 to the plug. Pressing the reset button now will connect power to the output end of the cord. In the embodiment of FIG. 4B, the electrical wire connection structure includes open slots 701a and 702a. With this structure, it is easier to align the hot and neutral line terminals 601 and 602 with the respective slots 701a and 702a and insert them into the slots.

In some embodiments, as shown in FIG. 3, a first wire crimping edge 301 is formed on the second cover 3, located between the pair of guiderails 303 and recessed upwards from the tips of the guiderails. A second wire crimping edge 201 is formed on the base cover 2 at a location corresponding to the first crimping edge 301, so that when the second cover 3 is fitted over the base cover 2, the power cord 6 is secured between the two crimping edges. As an example, the first crimping edge 301 and second crimping edge 201 have flat-bottomed U shapes or semi-circle shapes. In some embodiments, the recessed depth of the first crimping edge 301 of the second cover 3 is designed to accommodate power cords of different sizes or shapes. Thus, multiple second covers 3 may be manufactured, with the first crimping edge 301 located at different recessed depth to suit power cords of different sizes or shapes. The same first cover 1 and base cover 2 may be removably assembled with different second covers 3 that have different first crimping edges. In other words, during installation, depending on the shape and size of the power cord 6 of the appliance to be installed, the user may select a second cover 3 that has a first crimping edge suitable for the particular power cord. This way, the power plug can be assembled with power cords of different sizes and shapes, without disassembling or exchanging the base cover 2 and first cover 1, thereby enhancing the applicability and versatility of the power plug.

In some embodiments, the second cover 3 further includes a first strain relief slot 302, separated from the first crimping edge 301, for accommodating the strain relief. Similarly, the base cover 2 further includes a second strain relief slot 202, separated from the second crimping edge 201, for accommodating the strain relief. The distance between the first crimping edge 301 and the second crimping edge 201 is smaller than the distance between the first strain relief slot 302 and the second strain relief slot 202. This way, the second cover 3 and the base cover 2 not only serve to position and affix the cable strain relief of the power cord 6, but also serve to position and secure the portion of the power cord 6 located inside the plug, such as the portion 603 of the cord as shown in FIG. 3.

In the power plug according to embodiments of the present invention, the upper cover and the base cover of the power plug can be conveniently assembled together, and the power plug can be shipped and stored separately from the power cord. This helps to reduce the packaged size and cost of the power plug. When the power plug is to be assembled with the power cord, it can be quickly and conveniently accomplished by removing the second cover 3 and connecting the hot and neutral line terminals of the power cord to the trip assembly. The second cover 3 can then be fitted over and affixed to the base cover 2 by the fastening screws. This accomplishes the assembly of the power plug with the power cord. In this state, the first crimping edge 301 of the second cover 3 and the second crimping edge 201 of the base cover 2 securely crimp the portion 603 of the cord, to prevent the cord from being detached. Moreover, a part of the cable strain relief is restrained in the second strain relief slot 202 of the base cover 2 and the first strain relief slot 302 of the second cover 3, to further secure the cord to the plug. To install power cords of different sizes and shapes, the user only needs to select second covers 3 that have first crimping edges 301 of suitable recessed depths.

It should be understood that the embodiments shown in the drawings only illustrate the preferred shapes, sizes and spatial arrangements of the various components of the power plug. These illustrations do not limit the scope of the invention; other shapes, sizes and spatial arrangements may be used without departing from the spirit of the invention.

It will be apparent to those skilled in the art that various modification and variations can be made in the embodiments of the present invention without departing from the spirit or scope of the invention. Thus, it is intended that the present invention cover modifications and variations that come within the scope of the appended claims and their equivalents.

What is claimed is:

1. A leakage current protection device, comprising:
a shell; and
a trip assembly disposed inside the shell, configured to control electrical connection and disconnection between input and output ends of the leakage current protection device, the trip assembly having a tail portion adapted to be connected to electrical terminals of a power cord;
wherein the shell includes an upper cover and a base cover joined to each other, wherein either: the upper cover includes a first cover and a removable second cover, the removable second cover being in direct contact with both the first cover and the base cover, or: the base cover includes a first cover and a removable second cover, the removable second cover being in direct contact with both the first cover and the upper cover, and
wherein the removable second cover spatially corresponds to the tail portion of the trip assembly and is configured to expose the tail portion when the removable second cover is removed.

2. The leakage current protection device of claim 1, wherein the upper cover includes the first cover and the removable second cover, wherein the first cover and the base cover include snaps configured to affix them to each other, and the removable second cover is fitted over the base cover and affixed to the base cover by fasteners.

3. The leakage current protection device of claim 2, wherein the removable second cover includes one or more guiderails and the base cover includes one or more corresponding guiding troughs, wherein the one or more guiderails are configured to fit into the one or more corresponding guiding troughs when the removable second cover is affixed to the base cover.

4. The leakage current protection device of claim 3, wherein the first cover further includes a support shoulder which is recessed from an exterior surface of the first cover and configured to abut an inner side of the removable second cover.

5. The leakage current protection device of claim 3, wherein the removable second cover includes a pair of spaced-apart guiderails located near the tail portion of the trip assembly, and a first wire crimping edge formed between the pair of spaced-apart guiderails and recessed upwards from tips of the guiderails, wherein the base cover includes a second wire crimping edge at a location corresponding to the first crimping edge, and wherein the first and second crimping edges are adapted to crimp a portion of the power cord between them when the power cord is attached and the removable second cover is fitted over the base cover.

6. The leakage current protection device of claim 5, wherein the removable second cover further includes a first strain relief slot separated from the first crimping edge, and the base cover further includes a second strain relief slot separated from the second crimping edge, wherein the first strain relief slot and the second strain relief slot correspond to each other in space, and wherein a distance between the first crimping edge and the second crimping edge is smaller than a distance between the first strain relief slot and the second strain relief slot.

7. The leakage current protection device of claim 5, wherein a recess depth of the first crimping edge of the removable second cover is a predetermined depth that accommodates a size and shape of the power cord to be connected to the trip assembly.

8. The leakage current protection device of claim 2, wherein the first cover includes a plurality of hooks and/or buckles, and the base cover includes a corresponding plurality of buckles and/or hooks, the hooks and/or buckles of the first cover being configured to engage with the corresponding buckles and/or hooks of the base cover to form a plurality of snaps, which are configured to affix the first cover to the base cover.

9. The leakage current protection device of claim 1, wherein the tail portion of the trip assembly includes an electrical wire connection structure, the electrical wire connection structure including a plurality of through holes or open slots.

10. The leakage current protection device of claim 1, further comprising the power cord, the power cord including the electrical terminals connected to the tail portion of the trip assembly.

* * * * *